UNITED STATES PATENT OFFICE.

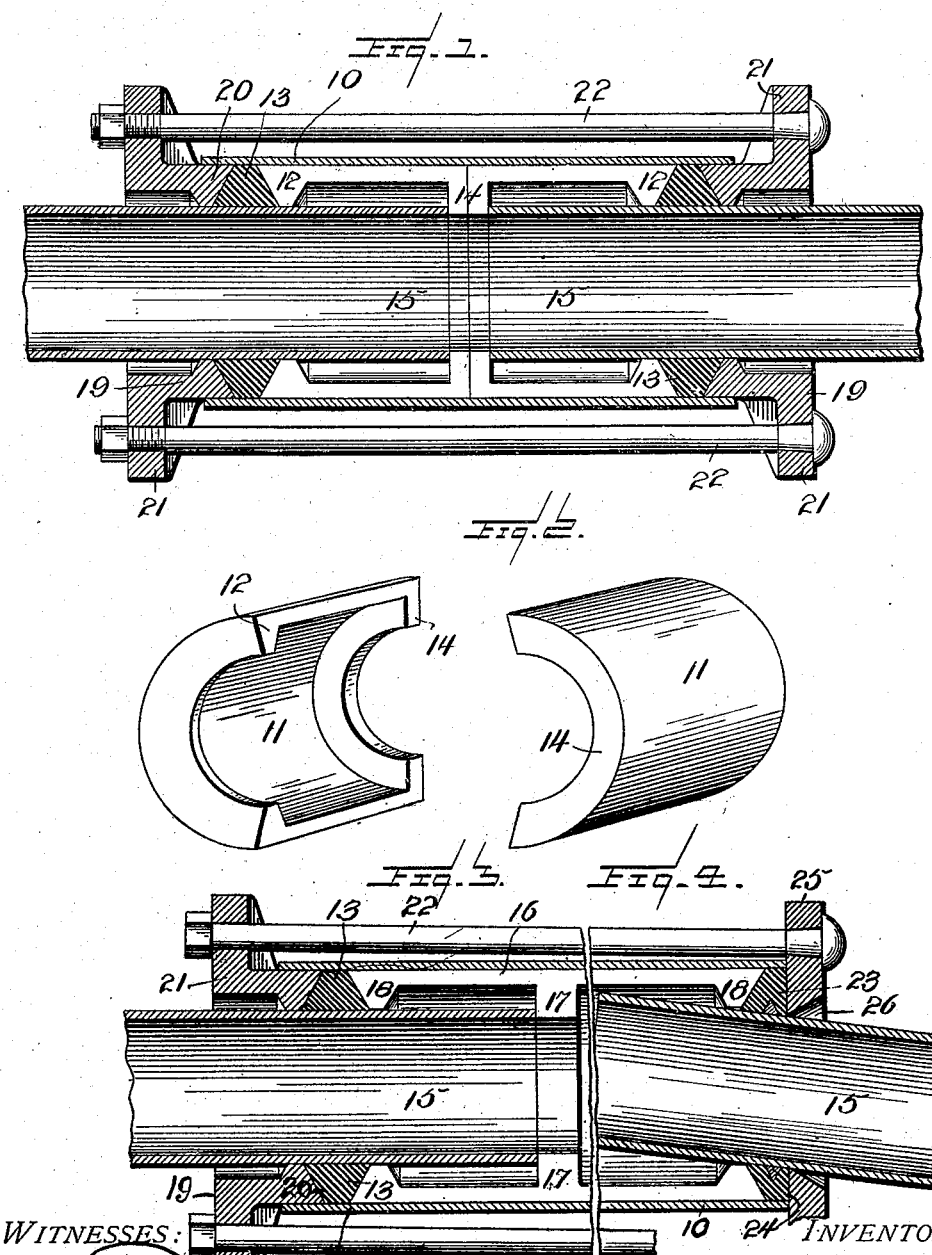

JOHN D. HAZLET, OF FRANKLIN, AND LEWIS L. LORD, OF MEADVILLE, PENNSYLVANIA.

PIPE-COUPLING.

No. 915,956.  Specification of Letters Patent.  Patented March 23, 1909.

Application filed October 13, 1908. Serial No. 457,527.

*To all whom it may concern:*

Be it known that we, JOHN D. HAZLET and LEWIS L. LORD, citizens of the United States, residing at Franklin, county of Venango, and Meadville, county of Crawford, State of Pennsylvania, respectively, have invented certain new and useful Improvements in Pipe-Couplings, of which the following is a specification, reference being had therein to the accompanying drawing.

This invention relates to a pipe coupling, and particularly to a detachable form thereof by which adjacent pipe sections may be connected to allow for proper expansion and contraction thereof and also a deflection of one section at an angle to the other.

The invention has for an object to provide a tubular body for the coupling within which bushings are disposed having interior flanges to engage the periphery of the pipe and provide a contact face in engagement with which a packing ring is disposed, said ring being compressed by glands drawn toward each other in the usual manner.

A further object of the invention is to provide a novel form of bushings having at their outer ends an interiorly extending flange to engage the periphery of the pipe and an abutting flange to contact with the ends of said pipe sections in order to centrally locate the coupling relative to the joint between the pipes, said bushings being formed in segmental sections to permit their ready application to the pipe sections.

Other and further objects and advantages of the invention will be hereinafter fully set forth and the novel features thereof defined by the appended claims.

In the drawing:—Figure 1 is a longitudinal section of the invention applied to pipe sections; Fig. 2 is a detail perspective of the separated bushings; Fig. 3 is a longitudinal section showing a modified form of bushing and Fig. 4 is a similar view of a modified form of plate or flange.

Like numerals refer to like parts in the several views of the drawing.

The numeral 10 designates the tubular body of the coupling which may be of any desired material, for instance, comprises a section of piping of proper diameter. Within this tubular body the bushings 11 are disposed and each thereof provided at one end with an exteriorly extending flange 12 adapted to contact with and compress a packing 13, while at the opposite end, or centrally of the tubular body, an abutting flange 14 is provided which is adapted to engage the ends of the pipe sections 15, as shown in Fig. 1. These bushings are preferably formed in two or more segmental sections adapted to be assembled about the pipe and with the flanges 14 thereof in contact with the pipe ends. Instead of forming these bushings of two members each comprising assembled sections, as shown in Fig. 1, the bushings may comprise a single member as indicated at 16 in Fig. 3, having a central abutting flange 17 and end flanges 18 performing the functions hereinbefore described. When formed as a single member it is preferably in two segmental sections.

Coöperating with the packing 13 is a pressure gland or plate 19 having the bearing face 20 to contact with the packing 13 and a bolting flange 21 adapted to receive the bolts 22 by which pressure is applied to the glands at the opposite ends thus compressing the packing both outwardly against the body 10 and inwardly against the outer periphery of the pipe. This pressure is assisted by the formation of the packing having inclined walls to coöperate with the faces of the bushings and glands, respectively.

A modified form of packing plate is disclosed in Fig. 4 where the packing is shown at 23 and is there provided with a straight wall 24 abutting against a flange plate 25 having a central tapered opening 26 through which the pipe section 15 extends. This form of plate effects a compression of the packing against both the pipe sections and the tubular body of the coupling, while the space between the flanges of the bushing permits a ready deflection of one section of the pipe at an angle to the other, as shown in Fig. 4. It will be seen that the use of this form of bushing permits its ready application within the tubular body and effects a compression of the packing against both the body and pipe sections, while the space allowed between the flanges of the bushing permits an angular deflection of one pipe section relative to the body of the coupling to any necessary extent and effects a tight connection between the pipe sections without the necessity of using specially constructed coupling members. The abutting flange carried by the bushing is disposed at a central point within the coupling and by contact with the pipe sections keeps the coupling centrally located at the joint, while permitting the necessary expansion and contraction. The packing flange at the ends of the bushing also forms a pivotal point for the deflection of the pipe section when desired and coöperates with the flange or gland to compress the packing at that point. It will also be noted that the outer face of the plate or gland is enlarged so as to provide space for the deflection of the pipe section, while any internal pressure which may escape at the ends of the pipe sections next the abutting flange is exerted against the packing flange at the end of the bushing and thus assists in maintaining the proper pressure against the packing to effect a tight joint at that point.

In applying the coupling the plates or glands are placed upon the pipe sections together with the packing and tubular body, these parts being slipped away from the joint. The joint of the pipe sections is then spaced the necessary distance to allow for expansion when the sections of the bushing are assembled about the joint and the tubular body slipped over these sections to retain them in position. The packings are then brought into contact with the ends of the sections and the glands applied to engage the packings when the necessary tension is secured by the bolts to apply pressure to the several parts. It will therefore be seen that this invention presents a simple and economically constructed form of coupling adapted to accomplish the most efficient results and which is maintained in central position about the joint so as to prevent creeping of the coupling upon the pipe, while allowing the necessary expansion and contraction thereof or a deflection of the pipe sections.

Having described our invention and set forth its merits, what we claim and desire to secure by Letters Patent is:—

1. A pipe coupling comprising a tubular body, a bushing disposed therein and provided with extended packing flanges engaging the periphery of the pipe sections and an abutting flange engaging the ends thereof, a packing disposed in contact with one face of each of said packing flanges, and means at the ends of the body compressing said packings.

2. A pipe coupling comprising a tubular body, a bushing disposed therein and provided with extended packing flanges engaging the periphery of the pipe sections and an abutting flange engaging the ends thereof, a packing disposed in contact with one face of each of said packing flanges, and a plate engaging said packing at each end of the body and provided with an enlarged aperture to permit inward deflection of the pipe sections therein.

3. A pipe coupling comprising a tubular body, a bushing disposed therein and provided with inwardly extending packing flanges at each end engaging the periphery of the pipe sections, a packing disposed in contact with one face of each of said flanges, means compressing said packing at the opposite ends of said body, and an inwardly extending abutting flange carried by the bushing centrally of said body and engaging the ends of the pipe sections.

4. A pipe coupling comprising a tubular body, segmental bushings disposed therein and provided with an inwardly extended packing flange and a parallel inwardly extended abutting flange to contact with the ends of the pipe sections, packings at the opposite ends of said bushings, and means for compressing said packings.

5. In a pipe coupling, a bushing provided at its end with an interiorly extended packing flange and also having an interiorly extended abutting flange of greater length than the packing flange and disposed to engage the pipe end.

6. In a pipe coupling, a tubular body, segmental bushings disposed therein each having at its outer end an interiorly extending gland flange and at its inner end a similarly disposed abutting flange of greater length than the gland flange, packing disposed within the body and in contact with said gland flanges, pressure plates having glands within said body in contact with the outer face of said packing, and compressing devices connecting said pressure plates.

In testimony whereof we affix our signatures in presence of two witnesses.

JOHN D. HAZLET.
LEWIS L. LORD.

Witnesses:
GEO. T. LINDEN,
J. B. FRY.